(12) United States Patent
Pan et al.

(10) Patent No.: US 8,194,355 B1
(45) Date of Patent: Jun. 5, 2012

(54) HEAD STACK ASSEMBLY WITH A LAMINATED FLEXURE HAVING A SNAP-THROUGH FEATURE

(75) Inventors: Tzong-Shii Pan, San Jose, CA (US); Ali Hosseinzadeh, Fremont, CA (US)

(73) Assignee: Western Digital Technologies, Inc., Irvine, CA (US)

(*) Notice: Subject to any disclaimer, the term of this patent is extended or adjusted under 35 U.S.C. 154(b) by 1063 days.

(21) Appl. No.: 12/117,049

(22) Filed: May 8, 2008

(51) Int. Cl.
*G11B 5/55* (2006.01)

(52) U.S. Cl. ............... 360/264.2; 360/245.8; 360/245.9; 360/266.3

(58) Field of Classification Search ............... 360/264.2, 360/245.8–245.9, 266.3
See application file for complete search history.

(56) References Cited

U.S. PATENT DOCUMENTS

| | | |
|---|---|---|
| 4,714,435 A | 12/1987 | Stipanuk et al. |
| 5,348,488 A | 9/1994 | Green et al. |
| 5,415,555 A | 5/1995 | Sobhani |
| 5,612,841 A | 3/1997 | Johnson |
| 5,668,684 A | 9/1997 | Palmer et al. |
| 5,827,084 A | 10/1998 | Biernath |
| 5,903,413 A | 5/1999 | Brooks, Jr. et al. |
| 5,920,465 A | 7/1999 | Tanaka |
| 5,947,750 A | 9/1999 | Alcoe et al. |
| 6,007,669 A | 12/1999 | Crumly et al. |
| 6,145,188 A | 11/2000 | Brooks, Jr. et al. |
| 6,360,426 B1 | 3/2002 | Summers et al. |
| 6,367,144 B1 | 4/2002 | Holaway et al. |
| 6,399,889 B1 * | 6/2002 | Korkowski et al. ........... 174/255 |
| 6,657,821 B1 | 12/2003 | Jenneke |
| 6,672,879 B2 | 1/2004 | Neidich et al. |
| 6,758,686 B2 | 7/2004 | Burdick |
| 7,538,981 B1 * | 5/2009 | Pan ........................... 360/264.2 |
| 7,907,369 B1 * | 3/2011 | Pan ........................... 360/264.2 |
| 2001/0021596 A1 | 9/2001 | Tamura |

* cited by examiner

*Primary Examiner* — Daniell L Negron
*Assistant Examiner* — Carlos E Garcia

(57) ABSTRACT

A novel head stack assembly (HSA) includes a flex cable with a first side and an opposing second side, and having a hole therethrough. The HSA also includes a head gimbal assembly (HGA) having a load beam, a laminated flexure attached to the load beam, and a head attached to the laminated flexure. The laminated flexure includes a flexure tail with a snap-through feature. The snap-through feature has a plurality of windows in the flexure tail, a snap-through feature central portion that is centric to the plurality of windows, and a plurality of lobes. Each lobe extends out from the snap-through feature central portion radially into one of the plurality of windows. The laminated flexure overlies and contacts the flex cable on its first side, but the snap-through feature is disposed through the hole so that each of the plurality of lobes contacts the flex cable on its second side.

16 Claims, 7 Drawing Sheets

HEAD STACK ASSEMBLY WITH A LAMINATED FLEXURE HAVING A SNAP-THROUGH FEATURE

BACKGROUND OF THE INVENTION

1. Field of the Invention

The present invention relates generally to the field of information storage devices, and more particularly to head stack assemblies used in such devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads-sometimes including heads that cannot write.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flex cable. The plurality of HGAs are attached to various arms of the actuator, and each of the laminated flexures of the HGAs has a flexure tail that is electrically connected to the HSA's flex cable.

To facilitate reliable electrical connection and secure attachment of the flexure tail(s) to the flex cable, for example by soldering, the flexure tail(s) must first be precisely positioned on or adjacent the flex cable. Such positioning must be maintained while electrical connection and secure attachment is established. Accordingly, there is a need in the art for improved flexure tail configurations to facilitate and maintain relative alignment during attachment of the flexure tail(s) to a flex cable.

SUMMARY

A novel head stack assembly (HSA) is disclosed and claimed. The HSA includes an actuator and a flex cable attached to the actuator. The flex cable includes a hole therethrough, a first side, and an opposing second side. At least one head gimbal assembly (HGA) is also attached to the actuator and includes a load beam; a laminated flexure that is attached to the load beam, and a head that is attached to the laminated flexure. The laminated flexure includes a snap-through feature. The snap-through feature includes a snap-through feature central portion, a plurality of windows in the flexure tail, and a plurality of lobes. The snap-through feature central portion is centric to the plurality of windows. Each lobe extends out from the snap-through feature central portion radially into one of the plurality of windows. The laminated flexure overlies and contacts the flex cable on its first side, but the snap-through feature is disposed through the hole in the flex cable so that each of the plurality of lobes contacts the flex cable on its second side.

DETAILED DESCRIPTION OF EXEMPLARY EMBODIMENTS

Figure 1:
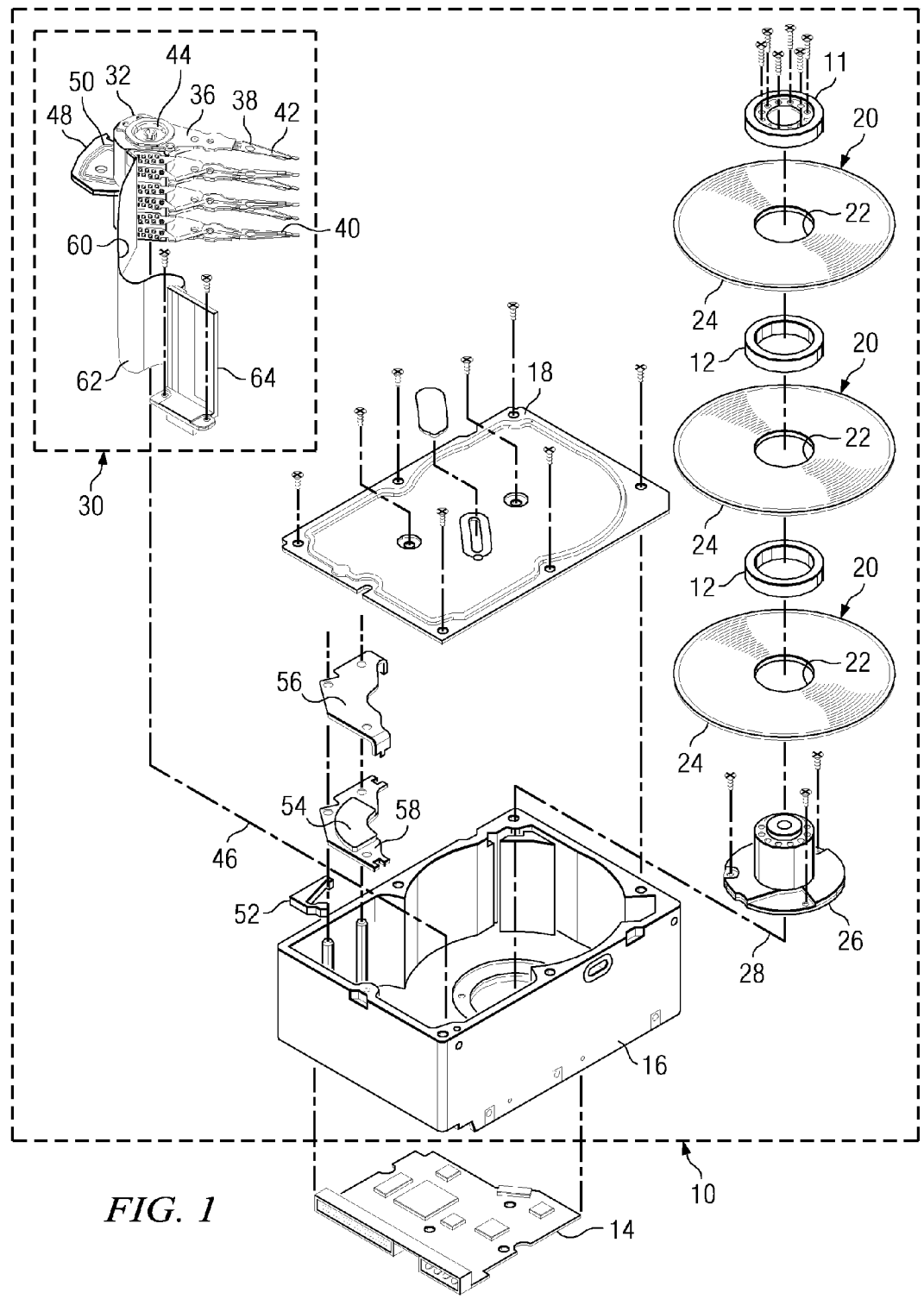
FIG. 1 is an exploded top perspective view of a disk drive including a head stack assembly that incorporates an embodiment of the present invention.

FIG. 1 illustrates a disk drive capable of including an embodiment of the present invention. The disk drive includes a head disk assembly (HDA) 10 and a printed circuit board assembly (PCBA) 14. The HDA 10 includes a base 16 and cover 18 that together house at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

The HDA 10 further includes a head stack assembly (HSA) 30 rotatably attached to the base 16 of HDA 10. The HSA 30 includes an actuator comprising an actuator body 32 and one or more actuator arms 36 extend from the actuator body 32. The actuator body 32 includes a bore 44 and a pivot bearing cartridge engaged within the bore for facilitating the HSA 30 to rotate relative to HDA 10 about actuator pivot axis 46. One or two head gimbal assemblies (HGA) 38 are attached to a distal end of each actuator arm 36. Each HGA includes a head (e.g. head 40) for reading and writing data from and to the disk 20. The HSA 30 further includes a coil support 48 that extends from one side of the HSA 30 that is opposite head 40. The coil support 48 is configured to support a coil 50 through which a changing electrical current is passed. The coil 50 interacts with one or more magnets 54 that are attached to base 16 via a yoke structure 56, 58, to form a voice coil motor for controllably rotating the HSA 30. HDA 10 includes a latch 52 rotatably mounted on base 16 to prevent undesired rotations of HSA 30.

The PCBA 14 includes a servo control system for generating servo control signals to control the current through the coil 50 and thereby position the HSA 30 relative to tracks disposed upon surfaces of disk 20. The HSA 30 is electrically connected to PCBA 14 via a flex cable assembly 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
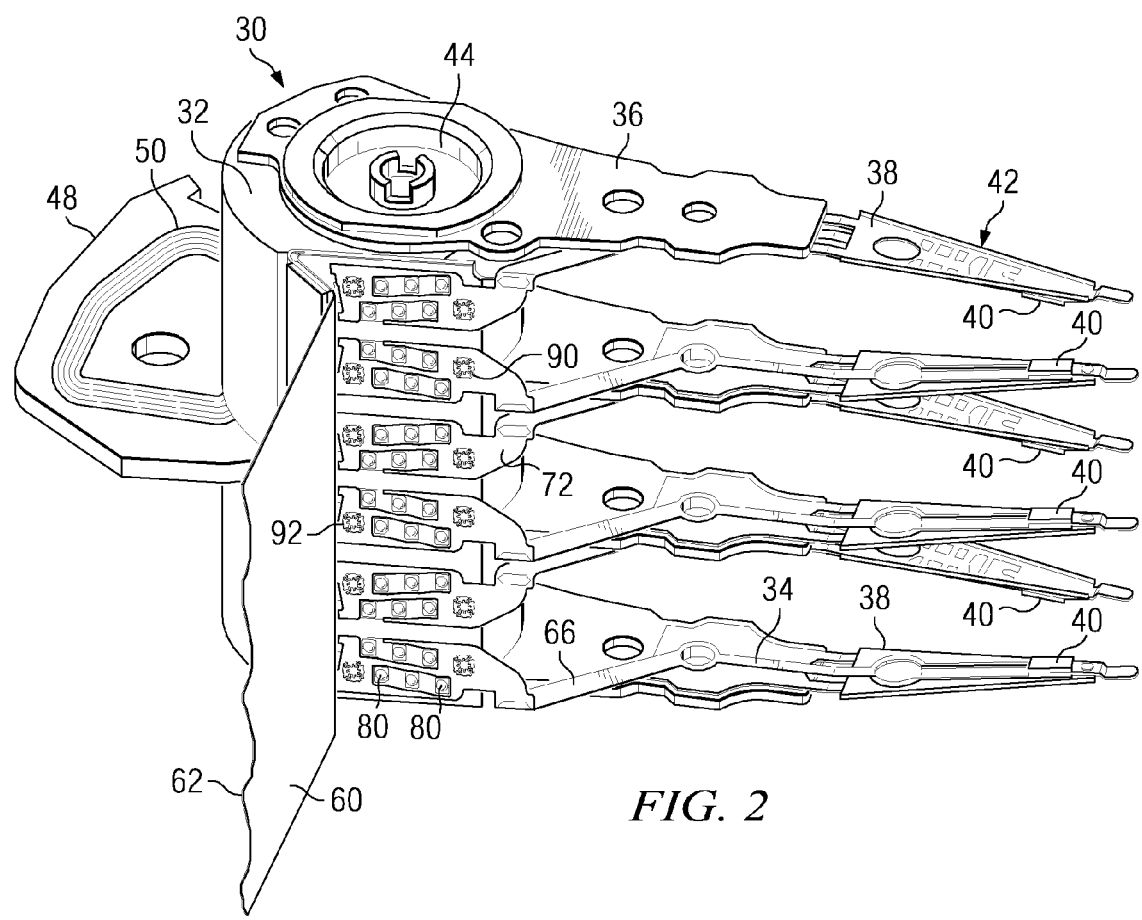
FIG. 2 is a perspective view of a head stack assembly that incorporates an embodiment of the present invention.
Figure 3A:
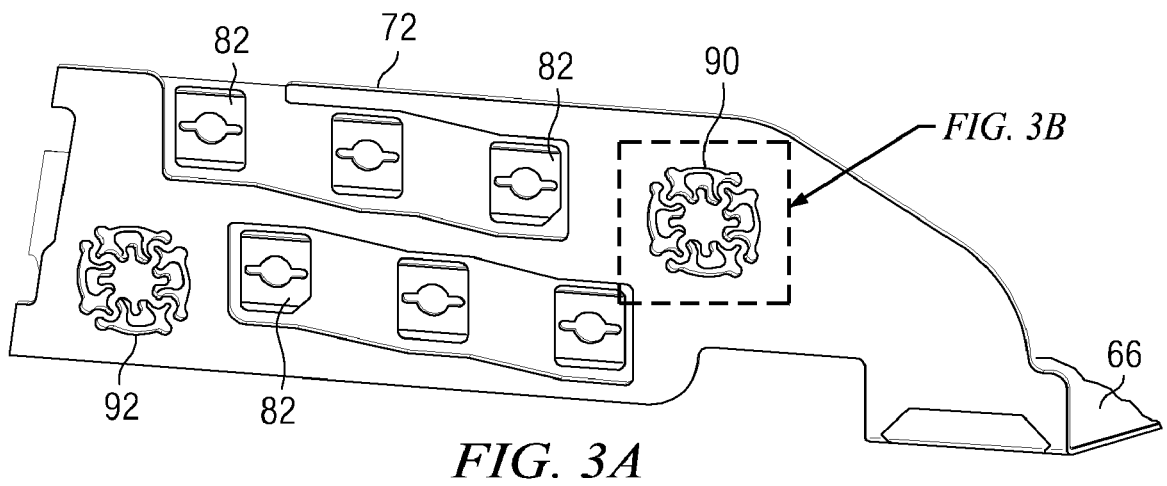
FIGS. 3A and 3B depict a terminal region of a flexure tail according to an embodiment of the present invention.
Figure 3B:
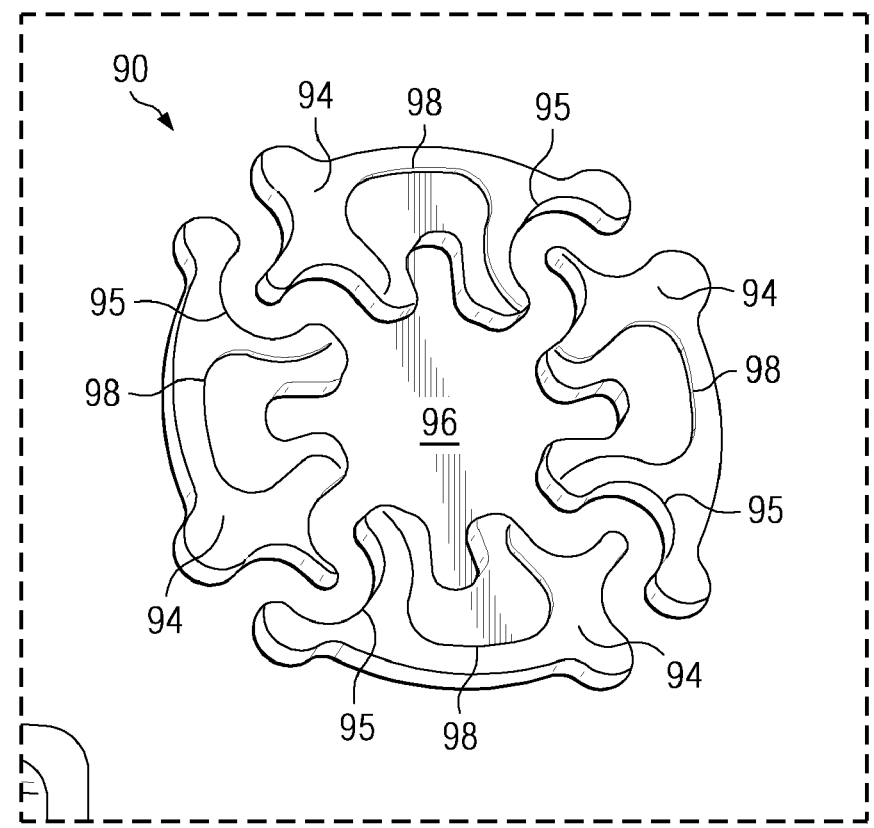
Figure 4:
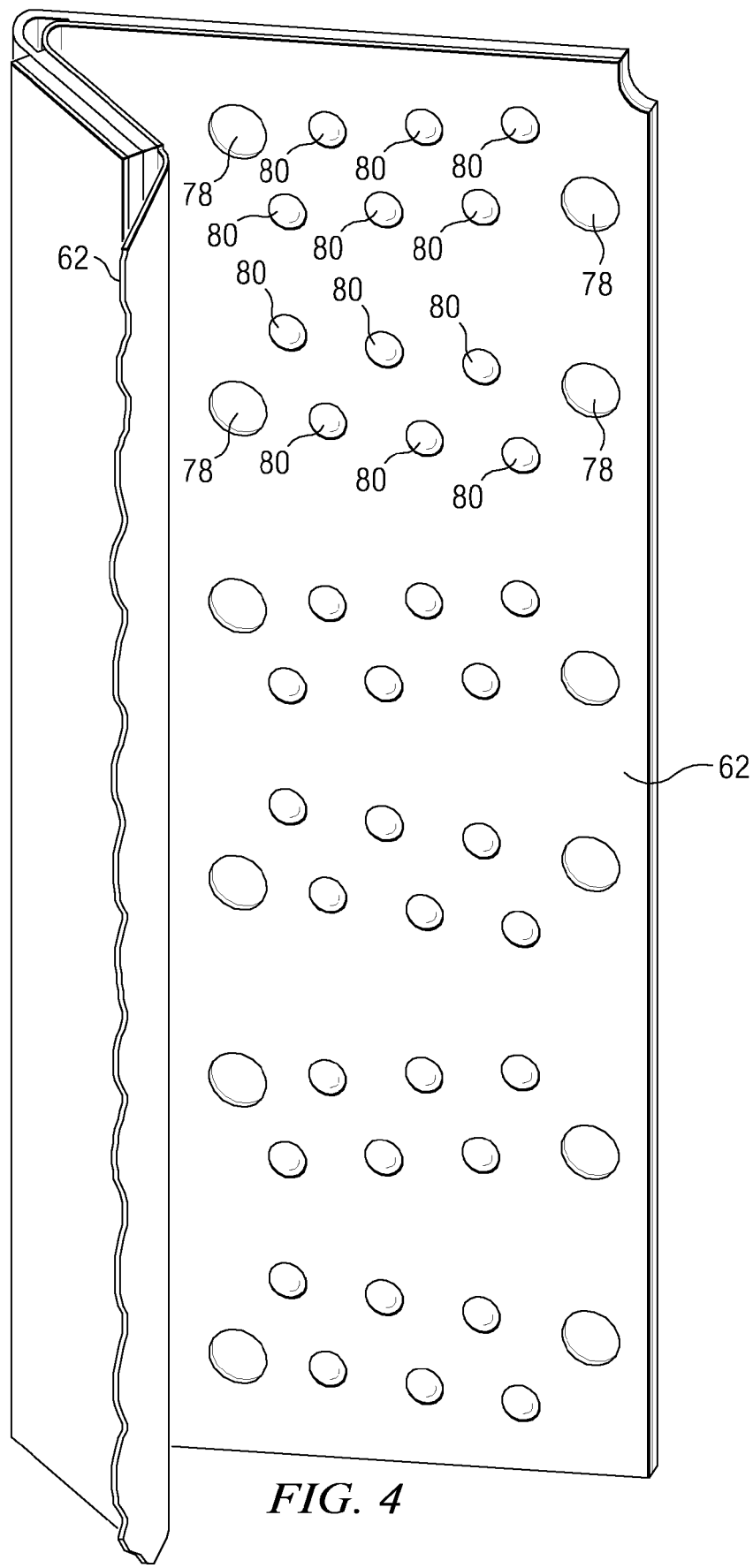
FIG. 4 depicts a portion of a flex cable that is capable of being used with an embodiment of the present invention.

Now referring to FIGS. 2-4, the head 40 is attached to and is electrically connected to a laminated flexure 34 that is a sub-component of the HGA 38 and is much smaller than the flex cable 62 of the HSA 30. The laminated flexure 34 has a gimbal region adjacent one end and a tail region adjacent an opposing end, the head 40 being attached to the laminated flexure 34 in the gimbal region, and the tail region including a flexure tail 66 that includes a terminal region 72. The laminated flexure 34 is attached to a load beam 42 that is also a sub-component of the HGA 38. The purpose of the load beam 42 is to provide vertical compliance for the head 40 to follow vertical undulation of the surface of disk 20 as it rotates, and to preload the head 40 against the surface of disk 20 as it rotates, by a preload force that is commonly referred to as the "gram load." A first purpose of the laminated flexure 34 is to provide compliance for the head 40 to follow pitch and roll angular undulations of the surface of disk 20 as it rotates, while restricting relative motion between the head 40 and the load beam 42 in the lateral direction and about a yaw axis. A second purpose of the laminated flexure 34 is to provide a plurality of electrical paths to the head to facilitate signal transmission to/from the head 40.

For that second purpose, the laminated flexure 34 includes electrically conductive traces that are isolated from a structural layer by a dielectric layer. For example, the conductive traces may comprise copper, the structural layer may comprise stainless steel, and the dielectric layer may comprise polyimide. Portions of the electrically conductive traces are sometimes coated with an insulative cover layer (e.g. a polymer layer). So that the signals from/to the head 40 can reach the flex cable 62 near the actuator body, each HGA laminated flexure 34 includes a flexure tail 66 that extends away from the head 40 along the actuator arm 36 and ultimately attaches to the flex cable 62 adjacent the actuator body 32. That is, the laminated flexure 34 includes traces that extend from adjacent the head 40 and terminate at electrical connection points at a terminal region 72 of the flexure tail 66. The terminal region 72 includes the plurality of electrical terminals 82. The flex cable 62 includes electrical conduits that terminate at electrical connection points 80 which correspond to the electric terminals 82 of the terminal region 72 of the flexure tail 66. Methods of electrical connection of the flexure tail 66 to the flex cable 62 include ultrasonic tab bonding, solder reflow, and solder ball jet (SBJ).

To electrically connect and securely attach the flexure tails 66 to the flex cable 62, the flexure tails 66 must first be aligned with and positioned on or adjacent the flex cable 62, and then held in alignment (at least temporarily) while electrical connection is established and secure attachment is completed. To accomplish this according to certain embodiments of the present invention, certain structural features are created in the flexure tails 66 and in the flex cable 62 that is attached to the actuator body 32.

For example, in the embodiment of FIGS. 2-4, the flex cable 62 includes a first side and an opposing second side. The flex cable 62 also includes a plurality of through holes 78 (i.e. holes 78 that pass through the flex cable 62 from the first side to the second side). Preferably, each of the holes 78 in the flex cable 62 has a radius that is at least 0.25 mm but no greater than 0.5 mm. As shown in FIG. 3A, each of the laminated flexures 34 includes a first snap-through feature 90. In the embodiment of FIG. 3A, each of the laminated flexures 34 also includes an optional second snap-through feature 92, however angular alignment may also be accomplished by other methods such as a clocking registration surface or a pin-in-slot arrangement. Another alternative is for the second snap-through feature 92 to align with a slot in the flex cable 62 rather than a circular hole in flex cable 62. In some cases this will allow for more repeatable alignment by allowing for tolerance and variation in the distance between the first snap-through feature 90 and the second snap-through feature 92, and/or the distance between the holes 78 in the flex cable 62. Optionally, if the second snap through feature 92 is aligned with a slot rather than a circular hole 78 in the flex cable 62, then second snap-through feature may preferably include fewer lobes than does the first snap-through feature 90.

In the embodiment of FIG. 3B, the first snap-through feature 90 includes a snap-through feature central portion 96, and a plurality of windows 94 in the terminal region 72 of the flexure tail 66. The snap-through feature central portion 96 is centric to the plurality of windows 94. Each of the plurality of windows 94 is separated from another by a web 95 of the snap-through feature that spans a radial extent of the windows and is connected to the snap-through feature central portion 96. Preferably, the shape of each web 95 permits travel of the snap-through feature center portion 96 normal to the plane of the terminal region 72 by bending of the web 95, without the web 95 needing to stretch. The serpentine shape shown in FIG. 3B is an example of a shape that permits this, though other shapes such as a spiral curved shape or zig-zag shape are possible.

In the embodiment of FIGS. 2-3B, the first snap through feature 90 also includes a plurality of lobes 98, each lobe 98 extending out from the snap-through feature central portion 96 radially into one of the plurality of windows 94. In the embodiment of FIG. 3B, each of the plurality of lobes 98 comprises a portion of the dielectric layer of the laminated flexure 34, but in certain alternative embodiments the plurality of lobes may comprise a portion of the structural layer of the laminated flexure 34. Preferably, the plurality of lobes includes at least two lobes but no more than six lobes. In the embodiment of FIG. 3B, the plurality of lobes 98 includes four lobes. Each of the plurality of windows 94 extends away from the snap-through feature central portion 96 for a radial distance that is at least 30 microns greater than the maximum radial extension of any of the plurality of lobes 98 away from the snap-through feature central portion 96.

Figure 5A:
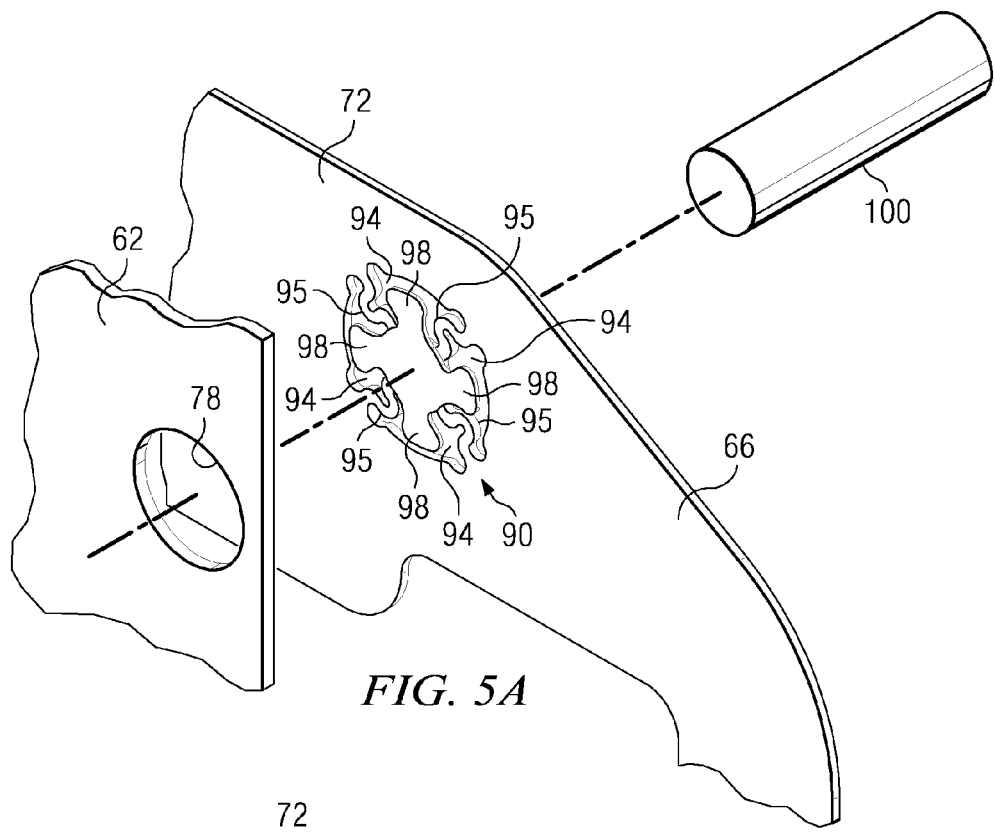
FIGS. 5A-5D depict a method to use a snap-through feature according to an embodiment of the present invention to align a flexure tail with a flex cable.

FIGS. 5A-5D depict an example method to use the snap-through feature 90 to align the flexure tail 66 with the flex cable 62, and then at least temporarily retain such alignment. As shown in FIG. 5A, the flexure tail 66 is initially approximately aligned with the flex cable 62 (e.g. so that the electrical terminals 82 of the terminal region 72 is approximately aligned with the connection points 80 of the flex cable 62), and the first snap through feature 90 is approximately aligned with the corresponding hole 78. Each of the plurality of lobes 98 is shown in FIG. 5A to be in an initial radially extended position. A tool 100 (e.g. a retractable push pin) is brought into alignment with the hole 78.

Figure 5B:
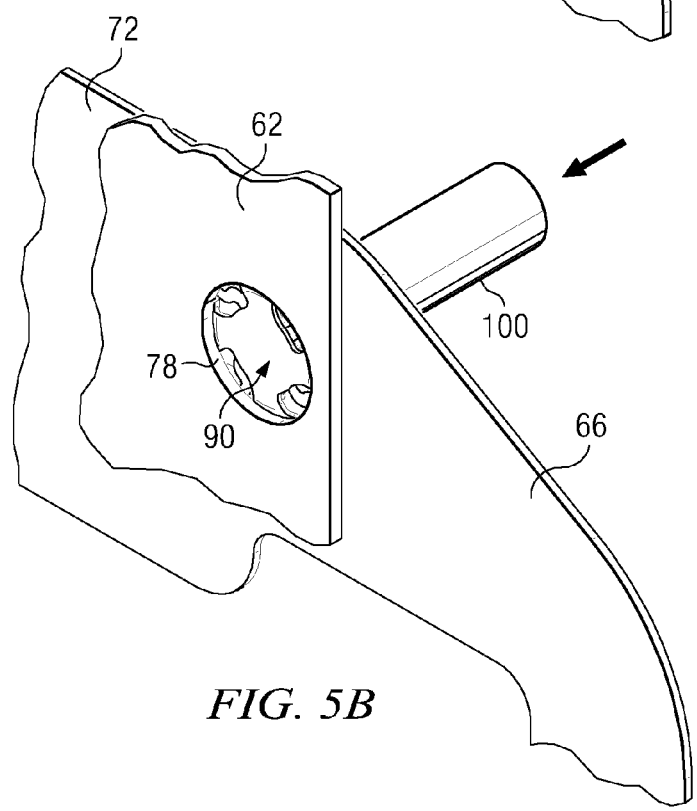
Figure 5C:
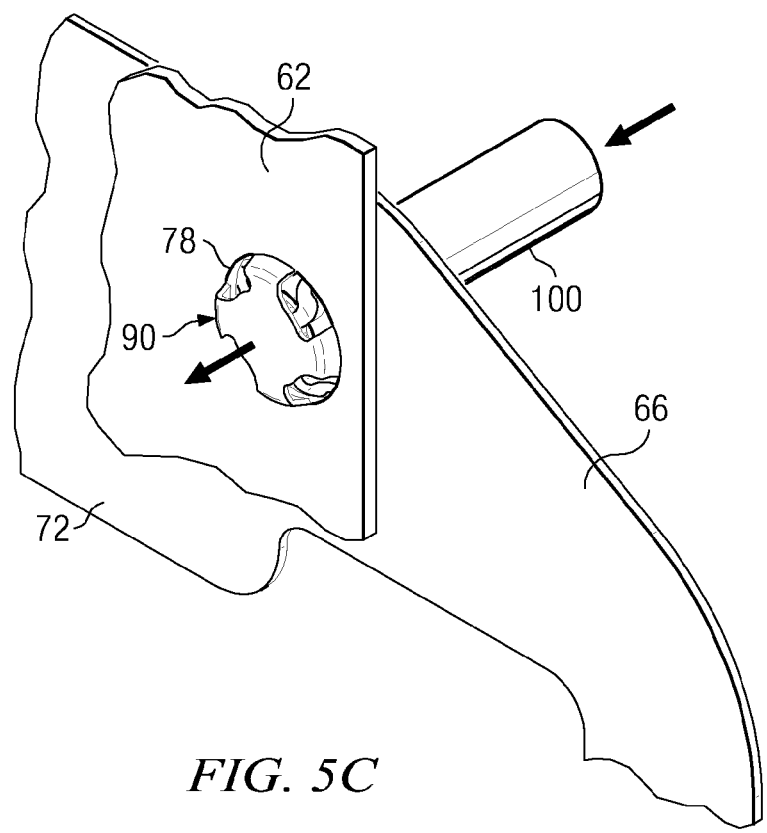
Figure 5D:
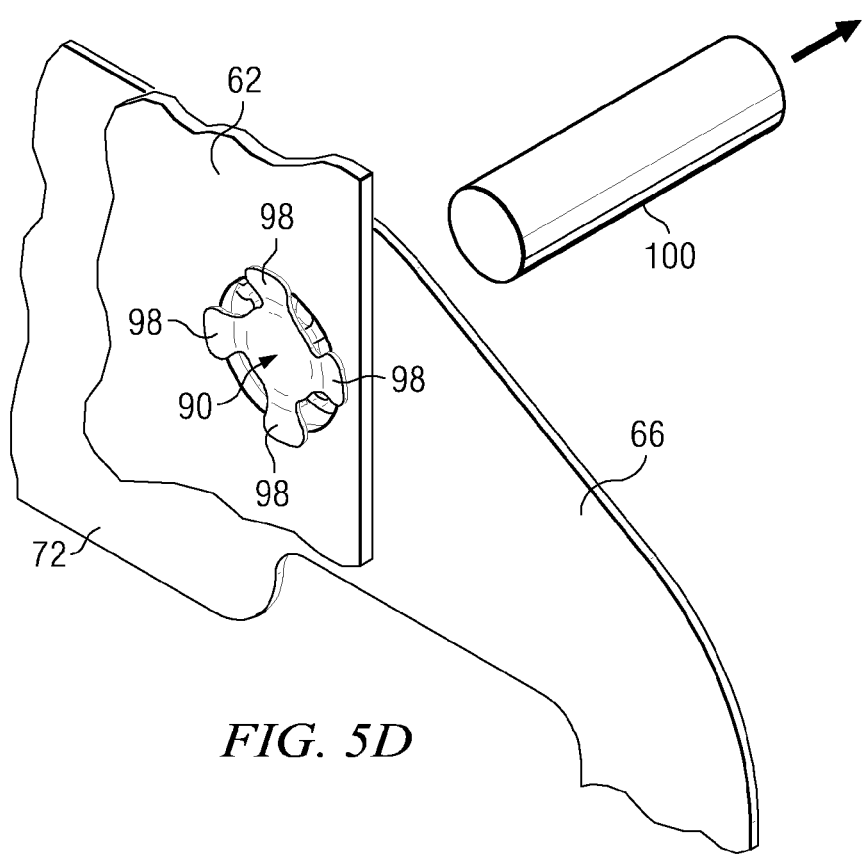

As shown in FIG. 5B, the tool 100 is next brought into contact with the snap-through feature 90 (preferably with the snap-through feature central portion 96). Next, as shown in FIG. 5C, the tool 100 is advanced into the hole 78, causing the plurality of lobes 98 to flex so as to permit entry into the hole 78, and potentially resulting in more precise alignment between the terminal region 72 of the flexure tail 66 and the flex cable 62. Ultimately, the tool 100 is advanced far enough into hole 78 so that the plurality of lobes 98 emerge on the second side of the flex cable 62 and are able to re-extend to a radially extended position that is similar though potentially not identical to the initial radially extended position that is shown in FIG. 5A. Finally, as shown in FIG. 5D, the flexure tail 66 is assembled with the flex cable 62, with the terminal region 72 of the flexure tail 66 of the laminated flexure 34 overlying and contacting the first side of the flex cable 62, but with the snap-through feature central portion 96 being disposed through the hole 78 in the flex cable 62 so that each of the plurality of lobes 98 contacts the second side of the flex cable 62. Preferably, each of the plurality of lobes 98 extends radially beyond the circumference of the hole 78 in the flex cable 62 by a radial distance that is at least 0.1 mm but no more than 0.3 mm.

Figure 6:
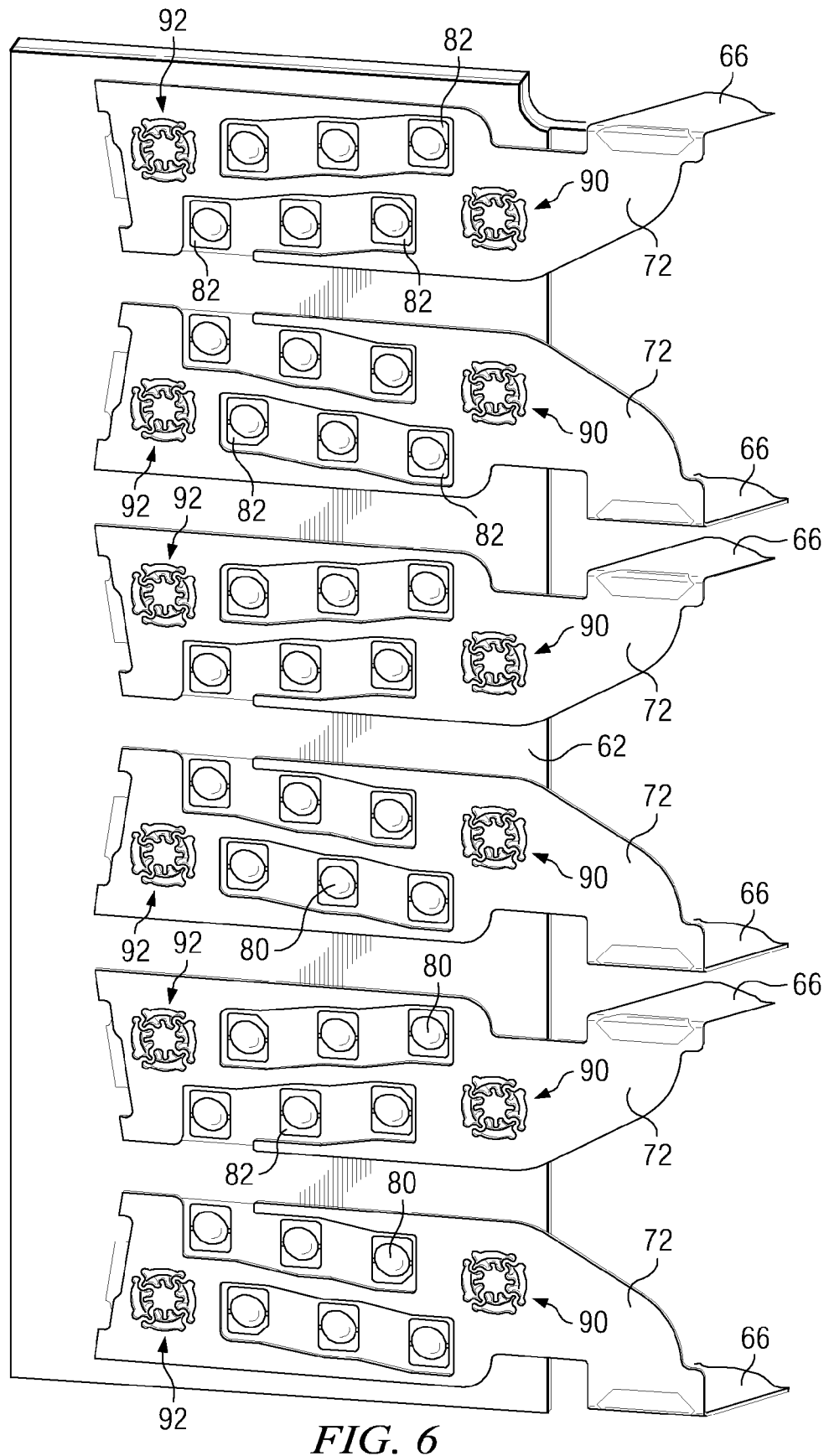
FIG. 6 depicts the alignment of a plurality of flexure tails with a flex cable by a plurality of snap-through features according to an embodiment of the present invention.

FIG. 6 depicts the alignment of the terminal regions 72 of a plurality of flexure tails 66 with a flex cable 62 by a plurality of first snap-through features 90 and a plurality of second snap-through features 92, according to an embodiment of the present invention. The electrical terminals 82 of the terminal region 72 are aligned with the connection points 80 of the flex cable 62 (e.g. to facilitate electrical coupling between the traces defined in the conductive layer of the laminated flexure 34 with the electrical connection points 80 on the first side of the flex cable 62). In the embodiment of FIG. 6, the first and second snap-through features 90, 92 are aligned with and engaged in holes 78 in the flex cable 62, as described above with reference to FIGS. 5A-5D.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A head stack assembly (HSA), comprising:
    an actuator;
    a flex cable attached to the actuator, the flex cable including a hole therethrough, a first side, and an opposing second side,
    a head gimbal assembly (HGA) attached to the actuator, the HGA including
        a load beam;
        a laminated flexure attached to the load beam, the laminated flexure including a plurality of layers; and
        a head attached to the laminated flexure;
    wherein the laminated flexure includes a first snap-through feature, the first snap-through feature including:
        a snap-through feature central portion that comprises a portion of at least one of the plurality of layers;
        a plurality of windows in the laminated flexure, the snap-through feature central portion being centric to the plurality of windows; and
        a plurality of lobes, each lobe extending out from the snap-through feature central portion radially into one of the plurality of windows; and
    wherein the laminated flexure overlies and contacts the flex cable on the first side, but the first snap-through feature is disposed through the hole in the flex cable so that each of the plurality of lobes contacts the flex cable on the second side.

2. The HSA of claim 1 wherein the plurality of layers includes a structural layer, a conductive layer, and a dielectric layer disposed between the structural and conductive layers, and the conductive layer is electrically coupled to the first side of the flex cable.

3. The HSA of claim 2 wherein each of the plurality of lobes comprises a portion of the dielectric layer.

4. The HSA of claim 2 wherein each of the plurality of lobes comprises a portion of the structural layer.

5. The HSA of claim 2 wherein the dielectric layer comprises polyimide, the structural layer comprises stainless steel, the conductive layer comprises copper, and the load beam comprises stainless steel.

6. The HSA of claim 1 wherein the plurality of lobes includes at least two lobes but no more than six lobes.

7. The HSA of claim 1 wherein the plurality of lobes includes three lobes.

8. The HSA of claim 1 wherein the plurality of lobes includes four lobes.

9. The HSA of claim 1 wherein each of the plurality of windows extends away from the snap-through feature central portion for a radial distance that is at least 30 microns greater than the maximum radial extension of any of the plurality of lobes away from the snap-through feature central portion.

10. The HSA of claim 1 wherein the hole in the flex cable has a radius that is at least 0.25 mm but no greater than 0.5 mm.

11. The HSA of claim 1 wherein each of the plurality of lobes extends radially beyond the circumference of the hole in the flex cable by a radial distance that is at least 0.1 mm but no more than 0.3 mm.

12. The HSA of claim 1 wherein the laminated flexure has a gimbal region adjacent one end and a tail region adjacent an opposing end, the head being attached to the laminated flexure in the gimbal region, and the tail region including the first snap-through feature.

13. A head stack assembly (HSA), comprising:
    an actuator;
    a flex cable attached to the actuator, the flex cable including a hole therethrough, a first side, and an opposing second side,
    a head gimbal assembly (HGA) attached to the actuator, the HGA including
        a load beam;
        a laminated flexure attached to the load beam; and
        a head attached to the laminated flexure;
    wherein the laminated flexure includes a first snap-through feature, the first snap-through feature including:
        a snap-through feature central portion;
        a plurality of windows in the laminated flexure, the snap-through feature central portion being centric to the plurality of windows; and
        a plurality of lobes, each lobe extending out from the snap-through feature central portion radially into one of the plurality of windows; and
    wherein the laminated flexure overlies and contacts the flex cable on the first side, but the first snap-through feature is disposed through the hole in the flex cable so that each of the plurality of lobes contacts the flex cable on the second side; and
    wherein the laminated flexure further comprises a second snap-through feature.

14. The HSA of claim 13 wherein the flex cable further comprises a slot therethrough, and the second snap-through feature is aligned with the slot.

15. A head stack assembly (HSA), comprising:
    an actuator;
    a flex cable attached to the actuator, the flex cable including a hole therethrough, a first side, and an opposing second side, a head gimbal assembly (HGA) attached to the actuator, the HGA including
 a load beam;
 a laminated flexure attached to the load beam; and
 a head attached to the laminated flexure;
 wherein the laminated flexure includes a first snap-through feature, the first snap-through feature including:
  a snap-through feature central portion;
  a plurality of windows in the laminated flexure, the snap-through feature central portion being centric to the plurality of windows; and
  a plurality of lobes, each lobe extending out from the snap-through feature central portion radially into one of the plurality of windows; and
 wherein the laminated flexure overlies and contacts the flex cable on the first side, but the first snap-through feature is disposed through the hole in the flex cable so that each of the plurality of lobes contacts the flex cable on the second side; and
 wherein two of the plurality of windows are separated from another by a web of the first snap-through feature that spans a radial extent of those two windows and is connected to the snap-through feature central portion, and the web is serpentine in shape.

16. The HSA of claim 14 wherein the second snap-through feature has fewer lobes than the first snap-through feature.

* * * * *